United States Patent Office.

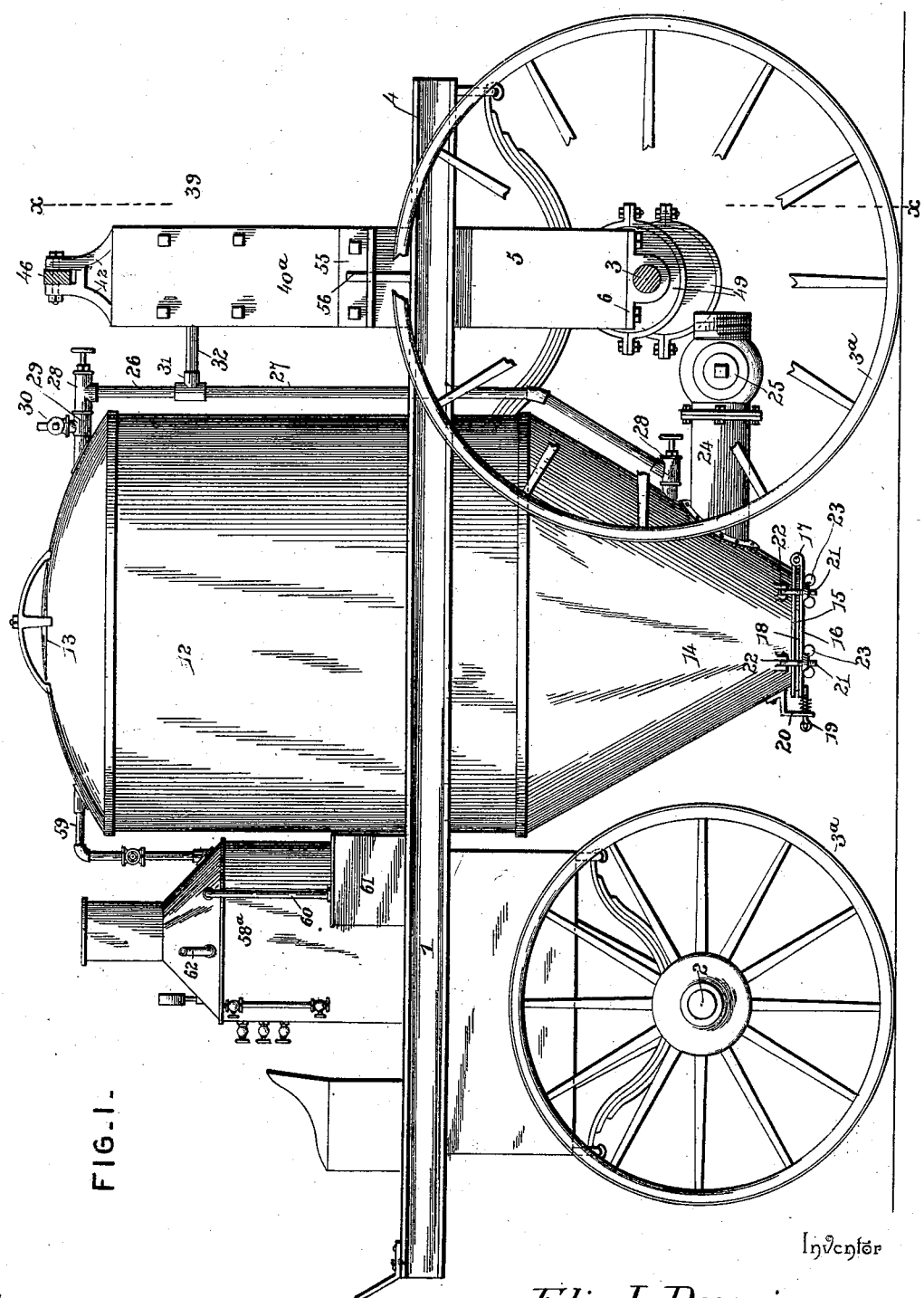

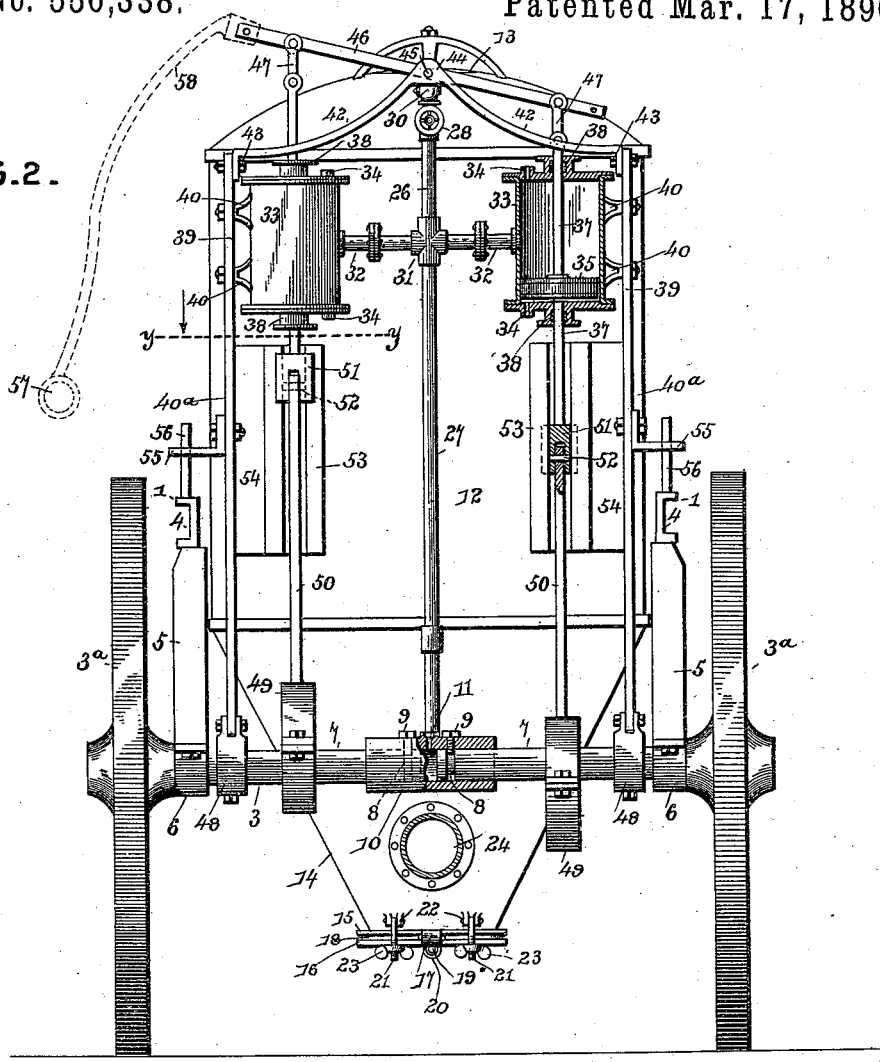

FELIX LOUIS DECARIE, OF MONTREAL, CANADA.

APPARATUS FOR CLEANING GUTTERS, &c.

SPECIFICATION forming part of Letters Patent No. 556,338, dated March 17, 1896.

Application filed December 6, 1894. Serial No. 531,041. (No model.)

*To all whom it may concern:*

Be it known that I, FELIX LOUIS DECARIE, a subject of the Queen of Great Britain, residing at Montreal, in the Province of Quebec and Dominion of Canada, have invented a new and useful Apparatus for Cleaning Gullies, Drains, and the Like, of which the following is a specification.

This invention relates to an apparatus for cleaning gullies, drains, and the like, and it has for its object to effect certain improvements in apparatus of this character whereby the same may be easily controlled in cold as well as in warm weather for the purpose of not only elevating and discharging large quantities of water or other liquids from gullies, drains or the like, but also being adapted for use as a fire-extinguisher, for road-sprinkling purposes, for thawing out gullies, cesspools, &c., and for destroying live animals that are commonly regarded as nuisances.

With these and other objects in view, which will readily appear as the nature of the invention is better understood, the same consists in the novel construction, combination, and arrangement of parts hereinafter more fully described, illustrated, and claimed.

In the drawings, Figure 1 is a side elevation, partly in section, of an apparatus constructed in accordance with this invention. Fig. 2 is a vertical sectional view on the line $x\,x$ of Fig. 1. Fig. 3 is a detail sectional view on the line $y\,y$ of Fig. 2. Fig. 4 is a detail plan view of one of the hand-levers employed in connection with the apparatus.

Referring to the accompanying drawings, 1 designates a portable frame mounted for transportation over the ground on the front and rear wheeled axles 2 and 3, respectively, carrying upon their opposite ends the ground-wheels 3ª; but in winter, if found necessary, the said frame may be supported on suitable sled-runners, as will be easily understood. The portable frame 1 essentially comprises the opposite parallel frame side bars 4, made of channel-iron, and depending from said frame side bars 4, near the rear ends thereof, are the opposite depending bearing-brackets 5, carrying at their lower ends the bearing-boxes 6, in which turn the opposite ends of the rear axle, 3. The rear axle, 3, for the frame 1 is sectional or divided and consists of the separate and independent axle-sections 7, that are independently rotated by the ground-wheels made fast on the outer ends thereof. The axle-sections 7 are arranged in direct horizontal alignment, and the inner adjacent ends of the axle-sections 7 are provided with the annular grooves 8, adapted to receive the inner ends of the set-screws 9, mounted in a loose axle-sleeve 10, arranged on the inner adjacent ends of the axle-sections 7 to provide for maintaining said sections in alignment, while at the same time not interfering with the independent rotation of the axle-sections when the apparatus is turned or backed, and said sleeve 10 is provided at a point intermediate of its ends with an oil-hole 11, providing means for the oiling of the sleeve and the ends of the axle-sections turning therein.

The portable wheeled frame 1 supports therein an enlarged upright vacuum-tank 12, that is preferably cylindrical in shape and extends above and below the frame. The said enlarged vacuum-tank 12 is provided at the top with an ordinary manhole 13, by means of which ready access may be had to the interior of the tank when necessary, and the said tank is provided below the frame 1 with a tapered or contracted bottom portion, 14, having the bottom discharge-opening, 15, for the discharge of the contents of the tank when full. The bottom discharge-opening, 15, of the upright vacuum-tank 12 is adapted to be closed by the swinging cover 16. The swinging cover 16 is hinged at one side, as at 17, to one side of the bottom portion of the tank, and when closed is adapted to have interposed between the same and the bottom edges of the tank a rubber or other suitable gasket 18 to form a perfectly air and water tight joint. The swinging edge of the cover 16 is adapted to be engaged by the spring-actuated latch-pin 19, mounted in the bracket-plate 20, secured to one side of the tank at the bottom thereof, and said latch-pin engages under the swinging edge of the cover to hold the same closed over the bottom discharge-opening, 15. In addition to the latch-pin 19 the cover or gate 16 is firmly clamped over the bottom opening, 15, by means of the hinged clamp-bolts 21, hinged or pivoted at one end, as at 22, to the bottom portion of the tank 12, and carrying at their free ends the clamp-nuts 23, that engage under the edges of the said cover or gate 16.

The upright vacuum-tank 12 has connected thereto at its lower end near the bottom discharge-opening thereof the main inlet-pipe 24, which is provided with a suitable cut-off cock 25, and with which inlet-pipe 24 is adapted to be connected a suitable hose or piping that is placed in the gully, cesspool, or other place from which liquid matter is to be elevated. The said tank 12 also has connected thereto the upper and lower suction-pipes, 26 and 27, respectively, both of which pipes are provided with cut-off valves 28, and the lower of which is connected to the tank 12 near the bottom discharge-opening thereof, and the upper of which pipes, 26, is connected to the upper end of the tank by means of a short pipe connection 29, which is provided with an air-vent cock 30, the function of which will be presently referred to.

The upper and lower suction-pipes, 26 and 27, of the tank 12 are connected at a point intermediate of the cut-off valves 28 thereof by a coupling 31, from which are branched separate pump inlet-pipes 32 that lead to the inlet-openings of oppositely-arranged and vertically-disposed pump-cylinders 33. The pump-cylinders 33 are provided with the top and bottom discharge-nipples 34 and accommodate therein ordinary pump piston-heads 35, mounted on the piston-rods 37, that work through the stuffing-boxes 38 at the top and bottom of the pump-cylinders, thereby providing an arrangement wherein the piston-rods for the pump-cylinders work both above and below the cylinders in reciprocating the piston-heads 35 to provide for causing a pumping action within the cylinders, and a consequent discharge of the air or water from the tank 12 through the discharge-nipples 34 at the top and bottom of the pump-cylinders.

The oppositely-located pump-cylinders 33 are secured to the opposite inner sides of an upright pump-frame 39, at the upper end thereof, by means of suitable attaching-brackets 40 fastened to one side of said pump-cylinders and to the sides of the frame 39, and said frame essentially consists of the opposite parallel upright-frame sides 40ª and a transverse stay-bracket 42, bolted at its opposite ends, as at 43, to the upper ends of the upright-frame sides 40ª, and the said transverse stay-bracket 42 is provided at an intermediate point with an upwardly-disposed bifurcated bearing-support 44, in which is pivotally mounted at an intermediate point, as at 45, a transverse walking-beam or lever 46, and the piston-rods 37 are connected at their upper ends above the cylinders with the walking-beam or lever 46 at both sides of its point of pivot by means of the short connecting-links 47, pivotally connected at their lower ends to the piston-rods and at their upper ends to the walking-beam or lever, which during the operation of the pumps serves to equalize the working of both pumps and to insure a steady and positive working thereof.

The upright-frame sides 40ª of the upright pump-supporting frame 39 are arranged inside and entirely independent of the portable frame 1, and at their lower ends the frame sides 40ª are connected to the bearings 48, that provide means for supporting the said pump-frame from the rear axle of the portable frame, while at the same time not interfering with the free rotation of the separate axle-sections. Adjacent to the bearings 48, on which the pump-frame 39 is supported, are located the reversely-mounted eccentrics 49, that are carried by the axle-sections 7, and have connected therewith the eccentric-rods 50, the upper ends of which are detachably connected to vertically-reciprocating sliding cross-heads 51 by means of the cross-head pins 52, and said sliding cross-heads 51 are connected to the lower ends of the piston-rods 37 to provide for the reciprocation of the piston-heads within the pump-cylinders, and by reason of the alternate or reverse arrangement of the eccentrics 49 the piston-heads in the opposite pump-cylinders alternately reciprocate to provide for a continuous and uninterrupted pumping action. The cross-heads 51 are mounted to slide between pairs of parallel vertically-disposed cross-head guides 53, that are fastened at one side of supporting-plates 54 secured to and projecting from the inner sides of the upright-frame sides 40ª.

The parallel upright-frame sides 40ª of the upright pump-frame have attached on the outside thereof at an intermediate point and above the frame side bars 4 the offstanding perforated bracket-plates 55, that loosely work over the fixed or stationary guide-pins 56 projected from the upper sides of the frame side bars 4, and this connection of the upright pump-frame with the portable wheel-frame for the apparatus provides for supporting the pump-frame in its proper upright position, while at the same time allowing the pump-frame to have an independent movement, so that it can adjust itself to any jarring or jostling of the truck without any undue strain.

When the apparatus is stationary and it is desired to operate the pump for certain purposes, the eccentric-rod connections with the sliding cross-heads are disconnected and suitable hand-levers 57 may be detachably fitted to opposite ends of the walking-beam or lever 46. The said hand-levers 57 are mounted in the socket-castings 58, that provide for the detachable connection of the handles to the ends of the walking-beam or lever.

To adapt the apparatus for use at all times and for the different objects sought, a steam-boiler 58ª is mounted on the frame 1, in front of the tank 12, and said steam-boiler has leading therefrom a valved steam-pipe 59, connected to the top of the tank 12, for forming a vacuum therein in winter. The said steam-boiler 58ª also has connected thereto a separate steam-pipe 60, leading to a water-tank 61 to keep the water therein warm for being fed to the boiler, and a separate pipe connection 62 may be made with said boiler for the purpose of thawing out gullies and other places to be cleaned in winter.

When the apparatus is in motion and the pumps geared up with the sectional axle in the manner described, it is simply necessary to open up the valve of the upper suction-pipe, 26, to exhaust the air from the tank 12. When a sufficient vacuum has been obtained, it is then simply necessary to place the pipe or hose for the main inlet-pipe in the gully or other place to be cleaned, and by opening the cock 25 the atmospheric pressure will force the liquid into the tank, after which the cock 25 is closed. To empty the tank the cover or gate 16 is opened, and also the air-vent cock 30. In winter the vacuum is produced in the tank by introducing steam therein through the pipe 59 and opening the air-vent cock 30 until all air is expelled therefrom. The cock 30 is then closed and the steam allowed to flow into the tank until a pressure is formed therein. The steam is then cut off and by condensation produces the necessary vacuum for the operation of the apparatus.

By attaching a sprinkler to the pipe 24 and reversing the pump the apparatus may be used as a road-sprinkler, and to use the apparatus as a fire-extinguisher the tank is filled with water by the means described and the lower suction-pipe, 27, opened up, so that the pump may draw out and discharge the water from the tank, and in this use of the apparatus the hand-levers 57 displace the gear connections with the pump.

A further use of the apparatus may be said to consist in making provision for destroying or killing dogs or other animals which are commonly regarded as nuisances in large cities. It is simply necessary to place these animals in the tank and then to exhaust the air therefrom in the usual manner.

Changes in the form, proportion, and the minor details of construction may be resorted to without departing from the principle or sacrificing any of the advantages of this invention.

Having thus described the invention, what is claimed, and desired to be secured by Letters Patent, is—

1. In an apparatus for cleaning gullies, drains and the like, the combination of a portable frame, an upright vacuum-tank supported within said frame and provided with a bottom air and water tight discharge-opening, and a main valve inlet-pipe forming a connection for suitable hose or piping, an upper valved air-suction pipe connected to the upper end of the tank and provided with an air-vent cock, a lower liquid-suction pipe connected to the tank near its lower end, a single coupling connecting the adjacent ends of the separate air and liquid suction pipes, a pump mounted within the portable frame and having the inlet-pipe thereof connected with said coupling for the two suction-pipes, and means for operating the pump, substantially as set forth.

2. In an apparatus for cleaning gullies, drains, and the like, the combination of a wheeled frame, a vacuum-tank supported in said frame and provided with a lower valved inlet-pipe and an upper air-suction pipe, an upright pump-frame supported on one of the axles of the wheeled frame, a double-cylinder pump mounted within the upright pump-frame and having its inlet connected with said suction-pipe, and means for operating the pump from one of the axles, substantially as set forth.

3. In an apparatus for cleaning gullies, drains, and the like, the combination of the wheeled frame provided at opposite sides with upwardly-disposed stationary guide-pins, one of the axles of said wheeled frame being sectional and consisting of independently-rotating sections, a vacuum-tank supported in said frame and provided with a lower valved inlet-pipe, valved upper and lower suction-pipes connected to the tank at one side, and the upper of which suction-pipes is further provided with an air-vent cock, an upright pump-frame arranged within the wheeled frame and loosely connected at its lower end to said sectional axle, said upright pump-frame being provided at opposite sides with offstanding perforated bracket-plates loosely working over said guide-pins, a double-cylinder pump mounted within the pump-frame and having its inlet connected with said suction-pipes, and means for operating the pump from the separate sections of the sectional axle, substantially as set forth.

4. In an apparatus for cleaning gullies, drains, and the like, the combination of the wheeled frame, one of the axles of which is sectional and consists of independently-rotating parts, an upright vacuum-tank supported in said frame and provided with a lower valved inlet-pipe, valved suction-pipes connected to said tank, an upright pump-frame supported for self-adjustment within the wheeled frame upon the sectional axle thereof, said pump-frame being provided at its upper end with a transverse stay-bracket having an intermediate bearing-support, opposite pump-cylinders secured to opposite inner sides of said pump-frame and having their inlets connected with said suction-pipes, the piston-rods for the pump-cylinders working above and below the same, a walking-beam or lever pivotally mounted in the bearing-support of said stay-bracket and connected with the upper ends of the piston-rods, vertical cross-head guides attached to the inner sides of the pump-frame below the cylinders, sliding cross-heads working in said guides and attached to the lower ends of the piston-rods, reversely-arranged eccentrics mounted on the separate sections of the sectional axle, and eccentric-rods connected to said eccentrics and detachably at their upper ends to said cross-heads, substantially as set forth.

In testimony that I claim the foregoing as my own I have hereto affixed my signature in the presence of witnesses.

FELIX LOUIS DECARIE.

Witnesses:
 A. SAUVÉ,
 A. G. ST. AMES, Jr.,
 D. PALMER.